DAVID C. WETSELL.
Improvement in Axle-Gauges.

No. 115,549.          Patented May 30, 1871.

Witnesses.
Chas. Kenyon
F. B. Curtis

Inventor
D. C. Wetsell,
Chipman Hosmer & Co,
Attys.

UNITED STATES PATENT OFFICE.

DAVID C. WETSELL, OF CARROLLTOWN, PENNSYLVANIA.

IMPROVEMENT IN AXLE-GAGES.

Specification forming part of Letters Patent No. 115,549, dated May 30, 1871.

*To all whom it may concern:*

Be it known that I, DAVID C. WETSELL, of Carrolltown, in the county of Cambria and State of Pennsylvania, have invented a new and valuable Improvement in Axle-Setter; and I do hereby declare that the following is a full, clear, and exact description of the construction and operation of the same, reference being had to the annexed drawing making a part of this specification and to the letters and figures of reference marked thereon.

Figure 1:
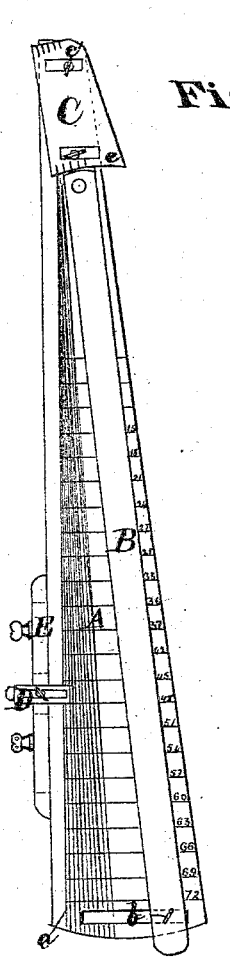
Figure 2:
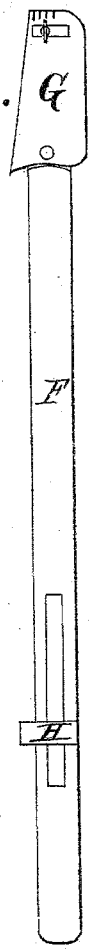
Figure 3:
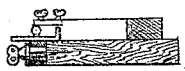
Figure 4:

Figure 1 of the drawing is a top view of the regulator or rule. Fig. 2 is a top view of the set. Figs. 3 and 4 are details.

This invention consists in the production of a device for use of wheelwrights and wagon-makers, by the aid of which the proper pitch of spindles and the proper length of axles adapted to the height of the wheel and the desired tread may be easily and accurately ascertained.

Referring to the accompanying drawing, A represents a rule or regulator, having a scale adapted to the varying size of wheels and the varying pitch given them, the scale being in the general form shown, of a scale of one-eighth of an inch to the inch. In order to determine the set of an axle and its spindle having the diameter and the pitch or tuck-under or over-plumb of the wheel, (for example, a wheel of five feet diameter, having a pitch of two and one-half inches,) move the lever B, which is pivoted to the rule A, and adjusted by a slot and thumb-screw at $b$, back from the center line $a$ $a$ a distance corresponding to the two and one-half inches pitch, which is five-halves inches, which, reduced to the scale, is one-eighth of five-halves inches, or five-sixteenths inch. The slide C is regulated in accordance with the diameter of the butt-box and the point of the spindle. In this example call the diameters aforesaid four inches and three inches; the half of each is two inches and one and one-half inch, which, on the scale, is two-eighths inch, and one a half-eighths, or three-sixteenths inch, which are the distances that the respective ends $c$ and $c'$ of the slide C, which has a scale, as shown, at each end, and which is regulated by means of slots and set-screws, as shown, must be moved forward from the bar B, to give the desired pitch of the spindle. The slide D, which is adjusted to the slide E by a slot and set-screw, must be drawn back from the center line $a$ the same distance as the end $c$ of the slide C is moved out from the lever B. In the example it is two-eighths inch. The slide E is held to the rule A by a slot and set-screws, and may be adjusted to suit axles and axle-stocks of different lengths. The lever B and the slide C being adjusted, the set F must be placed against the rule A, so that the slide H, which moves in a slot, as shown, may bear against the slide D, and the slide G, which is pivoted to the set F, and regulated by a slot and set-screw, as shown, may bear against the slide C, which gives to the set F the proper pitch, and, in the example, the proper pitch required for a five-foot wheel. The axle-stock should then be placed on the set F upside down, and the axle made with a pitch in accordance to that indicated by the set F. The length of axle required to track a certain width may be determined by means of the rule.

The device is adapted to any kind of axle, whether made of wood or iron, or with or without a skein. The set should be made of iron, as it would not be injured by coming in contact with a hot iron axle.

I claim as my invention—

A rule for wagon-makers, consisting of the rule A, lever B, slides C, E, D, G, and H, and set F, combined, arranged, and constructed substantially as and for the purpose specified.

In testimony that I claim the above I have hereunto subscribed my name in the presence of two witnesses.

DAVID C. WETSELL.

Witnesses:
T. R. SCANLAN,
H. C. KIRKPATRICK.